United States Patent
Feddes et al.

(10) Patent No.: US 8,004,947 B2
(45) Date of Patent: Aug. 23, 2011

(54) METHOD AND DEVICE FOR RECORDING MARKS IN AN INFORMATION LAYER OF AN OPTICAL DISC

(75) Inventors: Bas Feddes, Eindhoven (NL); Jacob Gerrit Nijboer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 685 days.

(21) Appl. No.: 11/915,747

(22) PCT Filed: May 19, 2006

(86) PCT No.: PCT/IB2006/051604
§ 371 (c)(1),
(2), (4) Date: Nov. 28, 2007

(87) PCT Pub. No.: WO2006/129221
PCT Pub. Date: Dec. 7, 2006

(65) Prior Publication Data
US 2008/0198719 A1    Aug. 21, 2008

(30) Foreign Application Priority Data
Jun. 3, 2005    (EP) .................................... 05104872

(51) Int. Cl.
*G11B 7/125* (2006.01)
(52) U.S. Cl. ............... 369/59.11; 369/59.12; 369/275.3; 369/116
(58) Field of Classification Search ............... 369/59.12, 369/59.11, 275.3, 59.25, 59.23, 116
See application file for complete search history.

(56) References Cited

U.S. PATENT DOCUMENTS

| | | | |
|---|---|---|---|
| 5,636,194 A * | 6/1997 | Furumiya et al. | 369/59.11 |
| 2003/0152006 A1 | 8/2003 | Ohkura et al. | |
| 2004/0136307 A1 | 7/2004 | Ito et al. | |
| 2004/0208104 A1* | 10/2004 | Kobayashi et al. | 369/59.11 |
| 2004/0240361 A1* | 12/2004 | Kato et al. | 369/59.11 |
| 2005/0063272 A1* | 3/2005 | Shingai et al. | 369/59.11 |
| 2006/0153038 A1 | 7/2006 | Yamaguchi et al. | |

FOREIGN PATENT DOCUMENTS

| | | |
|---|---|---|
| EP | 1249834 A2 | 10/2002 |
| EP | 1361569 A2 | 11/2003 |
| EP | 1638092 | 3/2006 |
| WO | 02089121 | 11/2002 |
| WO | 2004034386 | 4/2004 |
| WO | 2004077419 | 10/2004 |

OTHER PUBLICATIONS

ISR/Written Opinion of the International Searching Authority PCT/IB2006051604.

* cited by examiner

*Primary Examiner* — Wayne R Young
*Assistant Examiner* — Dionne H Pendleton

(57) ABSTRACT

A method of recording marks onto an optical disc, the optical disc comprising an information layer, by irradiating the information layer by a pulsed radiation beam, a mark (I3 . . . I14) having a time length of nT, n representing an integer larger than one and T representing the length of one period of a reference clock, being recorded by a sequence comprising m write pulses separated by cooling periods, the write pulses within the sequence being allowed to have different time lengths, the write pulses comprised in sequences corresponding to marks of different time lengths being allowed to have different lengths, m being an integer number given by Floor $(n/\alpha)$, where Floor$(n/\alpha)$ defines the largest integer smaller than $n/\alpha$, wherein a is an integer number larger than or equal to 2. The method characterized by modifying at least the sequence comprising the longest write pulse such that the longest write pulse is replaced by two write pulses.

11 Claims, 7 Drawing Sheets

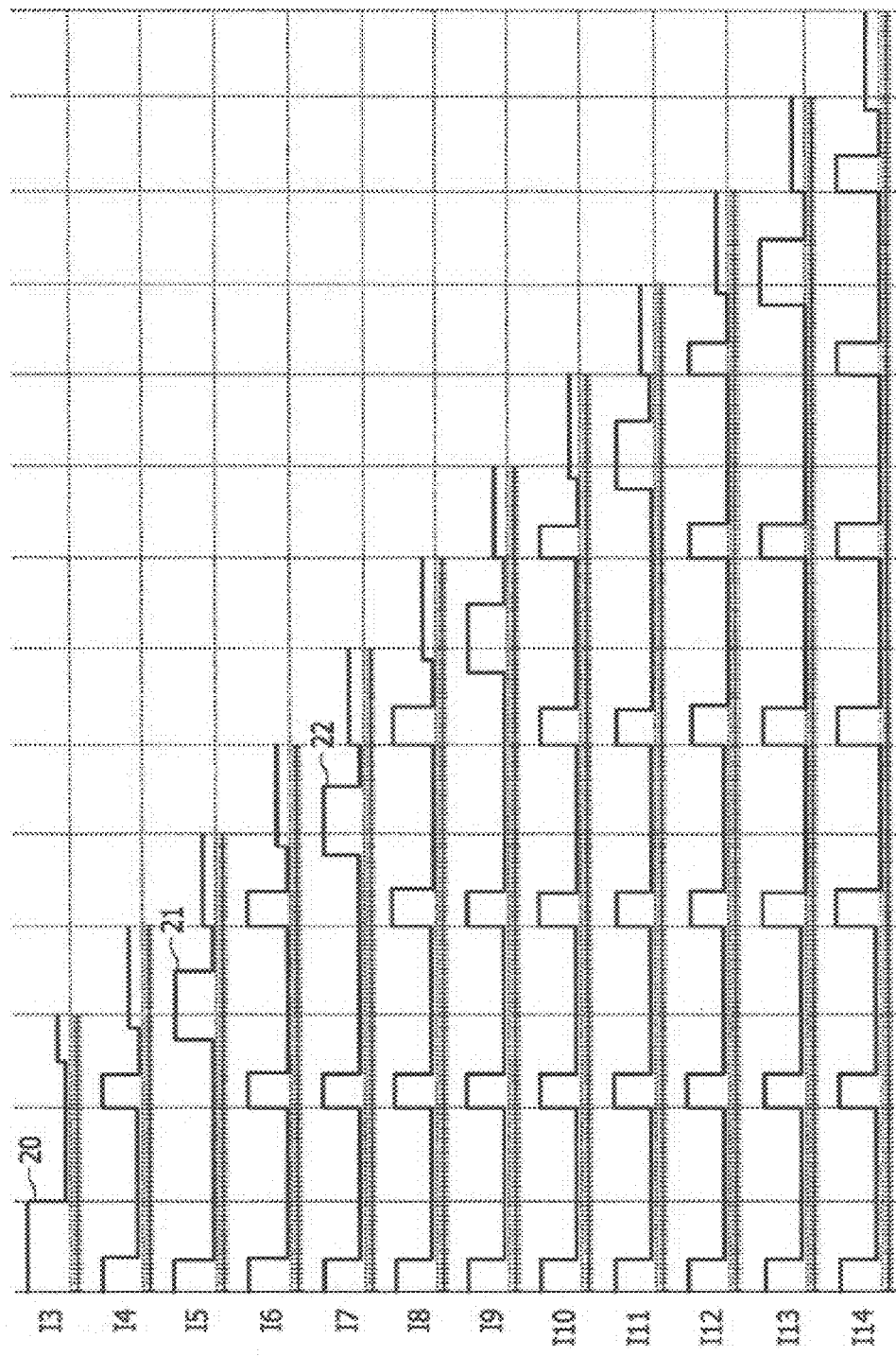

METHOD AND DEVICE FOR RECORDING MARKS IN AN INFORMATION LAYER OF AN OPTICAL DISC

The present invention relates to a method of recording marks having a time length of nT onto an optical disc comprising an information layer by irradiating the information layer with a pulsed radiation beam, each mark being recorded by a sequence of m pulses, n being an integer larger than 1, T representing the length of one period of a reference clock, and m represents an integer larger than or equal to 1 and lower than or equal to n.

This invention also relates to a recording device for recording marks onto an optical disc capable of carrying out the said method. This invention also relates to an optical disc suitable for cooperating with the recording device in carrying out the said method.

Rewritable media, for example DVD+RW, can be overwritten many times. The reversible recording process is based on the use of an information layer comprising a phase change material that is reversibly changeable between the amorphous and crystalline phase. Amorphous marks are recorded within the crystalline matrix of the information layer, by irradiating the information layer with sequences of short radiation pulses, for example sequences of laser pulses. The radiation pulses melt the phase change material. If the subsequent cooling after turning off the radiation beam is rapid, the amorphous phase is frozen. If the subsequent cooling after turning off the radiation beam is slow, it allows recrystallization and induces a crystalline phase. Consequently such a phase change layer allows information to be recorded and erased by modulating the power of the radiation beam between a write power level and an erase level. The readout is performed by detecting differences in optical properties between the amorphous and crystalline phases of the phase change layer thereby reproducing the recording signals.

It is desirable that the number of times the media can be direct overwritten (DOW) before media degradation takes place is as high as possible. For example, in the DVD+RW standard, it is mandated that the jitter shall stay below 10% for any number of direct overwrites (500). A number of 1000 direct overwrites (DOW), while all parameters stay within their range, is recommended. The problem is that during the repeated process of recording, the media, comprising a stack of layered materials, the phase change layer being one of the layers of such a stack, slowly degrades, often due to thermal inter-diffusion of layers. This degradation process limits the maximum number of achievable direct overwrites (DOW). A known solution for increasing the number of achievable direct overwrites (DOW) is by using capping layers of stable materials, e.g. $Si_3N_4$, around the phase change material, thus reducing the inter-diffusion between different layers. The above mentioned solution of using of capping layers of stable materials not only is expensive and technologically difficult to implement, but alone does not provide sufficient increase in the number of achievable direct overwrites (DOW), especially in the case of recording media making use of two information layers, to reach the number of achievable direct overwrites (DOW) mandated by the standards.

One expects that recording marks having the longest time length would be the most harmful to the information layer comprised in the layers stack of the optical disc. This expectation is based on the following reasoning: Degradation of the quality of the information layer takes place because of inter-diffusion with other layers forming the layers stack. The presence of higher temperatures accelerates material inter-diffusion in the layer stack; therefore negatively influencing the number of achievable direct overwrites (DOW). Amorphous marks are written within the crystalline matrix of the information layer by irradiating the information layer with sequences of short radiation pulses, known as write pulses. As the write pulses are of comparable lengths, one expects that the highest temperatures within the layer stack to be reached during recording of the longest marks, as heat accumulates due to the repetitive pulses. Hence one expects the highest temperatures and the strongest degradation of the information layer to take place during recording of the longest marks. The validity of these expectations can be seen by analyzing the dependence of the measured jitter as function of the number of direct overwrites (DOW), when the optical disc is exclusively recorded by marks having a fixed length. The jitter is due to variation in the length of the marks and is the most important source of noise for information readout, therefore is a measure for the quality of the written data. For example, the DVD standard specifies that the maximum allowed value for the jitter is 9%. When the results for marks I4, I8, and I14 are compared, the stack shows a faster degradation when longer marks are recorded, indicating a negative influence of the higher average temperatures that arise in the longer pulses.

It is an object of the invention to provide a solution to the above-mentioned problem and increase the number of achievable direct overwrites (DOW) that can be reached. The object of the invention is achieved by recording marks onto an optical disc according to a method as claimed in claim 1. The claimed method is a consequence of the insight that modifying the write strategy so that at least the longest write pulse is replaced by two shorter write pulses can improve very significantly the number of achievable direct overwrites (DOW). The insight is based on the unexpected finding that, opposite to the expectation that recording marks having the longest time length would be the most harmful to the information layer, the most relevant factor in determining the number of achievable direct overwrites (DOW) is not the length of the mark, but the time length of longest write pulse. Reducing this time length by replacing the longest write pulse with two shorter write pulses improves very significantly the number of achievable direct overwrites (DOW).

For example, in case of dual layer DVD+RW media, the number of achievable direct overwrites (DOW) when recording the normal DVD data is limited by the number of achievable direct overwrites (DOW) due to recording of I3 marks and not due to recording of longer marks, as shown in FIG. 5. Clearly, these I3 marks, comprising a very long write pulse, are more harmful to the stack than the any other marks. The explanation for the observed phenomenon is the following: according to a state of art write strategy, mark I3 is recorded by means of a relatively long write pulse. The temperature of the material stack in the spot where the radiation beam is focused increases rapidly when the first write pulse from a sequence is present. After the first write pulse is ended, the temperature starts to drops rapidly as function of time during the cooling period due to heat diffusion outside the spot. The temperature at the end of the cooling period is higher than the temperature before the start of the sequence, but much lower than the peak temperature reached at the end of the write pulse. When the second write pulse is present, the temperature starts to increase rapidly again and drops rapidly as the write pulse ends. As the sequence of pulses progresses the average temperature of the stack increases. However the highest temperature in the stack is very different from the average temperature and most probably is reached at the end of the longest write pulse. Consequently the destruction of the materials stack by the recording of marks can be limited by a modifying the recording method according to claim 1. If two short write pulses separated by a cooling period are used to replace the longest individual radiation pulse, the number of achievable direct overwrites (DOW) significantly increases.

An advantageous embodiment is obtained by the measures of claim 2. Setting α=2 and recording mark I3 by a sequence of write pulses comprising one long write pulse is a preferred write strategy in the art for recording high speed recordable optical disc, for example DVD+RW 8× media or multilayered RW media. For media of these types, modifying the write strategy according to the measures of claim 2 leads to a significant increase in the number of achievable direct overwrites (DOW).

An advantageous embodiment is obtained by the measures of claim 3. Setting α=3 and recording marks I3 and I4 by a sequence of pulses comprising one long write pulse is a known method in the art expected to be used in recording high speed rewritable Blu-disc (BD). An increase in the number of achievable direct overwrites (DOW) is obtained by recording marks I3 and I4, having lengths of 3T and 4T, respectively, by a sequence comprising two write pulses.

While good results are already obtained by modifying only the sequence comprising the longest write pulse, further improvements are obtained in a preferred embodiment of the method according to claim 4. Herein each sequence comprising an write pulse longer than the median length of the write pulses comprised in the sequence is modified such that the longer write pulse is replaced by two write pulses. Preferably each sequence comprising a write pulse longer by at least 5% than the median length of the write pulses comprised in the sequence is modified such that the longer write pulse is replaced by two write pulses.

It is preferred that the sequence of write pulses is followed by an erase pulse, the power of the erase pulse being lower than that of a write pulse.

When an nT mark is recorded by a sequence of m write pulses according to the invention, marks of different time lengths may be recorded by sequences comprising the same number of pulses. For example, when α is set to 2, marks I3 and I4 are each recorded by a sequence comprising two pulses. Because of this, additional fine-tuning of the sequence of radiation pulses may be required. In an embodiment according to the invention the position of at least one radiation pulse in the sequence is set in dependence on n. In a further embodiment of the method according to the invention the power of at least one of the radiation pulses is set in dependence on n.

The invention also includes an optical disc according to claim 10. An optical disc comprising stored information, the information being preferably pre-recorded onto the optical disc during the manufacturing process, the information arranged such that when read by a recording apparatus it enables the recording apparatus to record marks onto the optical disc according to a method of any of the previous claims.

The invention also includes an optical disc drive according to claim 10.

These and other aspects of the invention are apparent from and will be elucidated with reference to following more particular description of several embodiments described hereinafter.

The features and advantages of the invention will be appreciated upon reference to the following drawings, in which:

FIG. 2 illustrates a state of art method of recording marks known under the name N/2 strategy of recording marks, for marks of lengths 3T to 14 T.

only I3 marks are recorded (open squares);
only I4 marks are recorded (full triangles);
only I8 marks are recorded (open circles);
only I14 marks are recorded (full squares);
representative DVD data is recorded (full circles).

Figure 6:
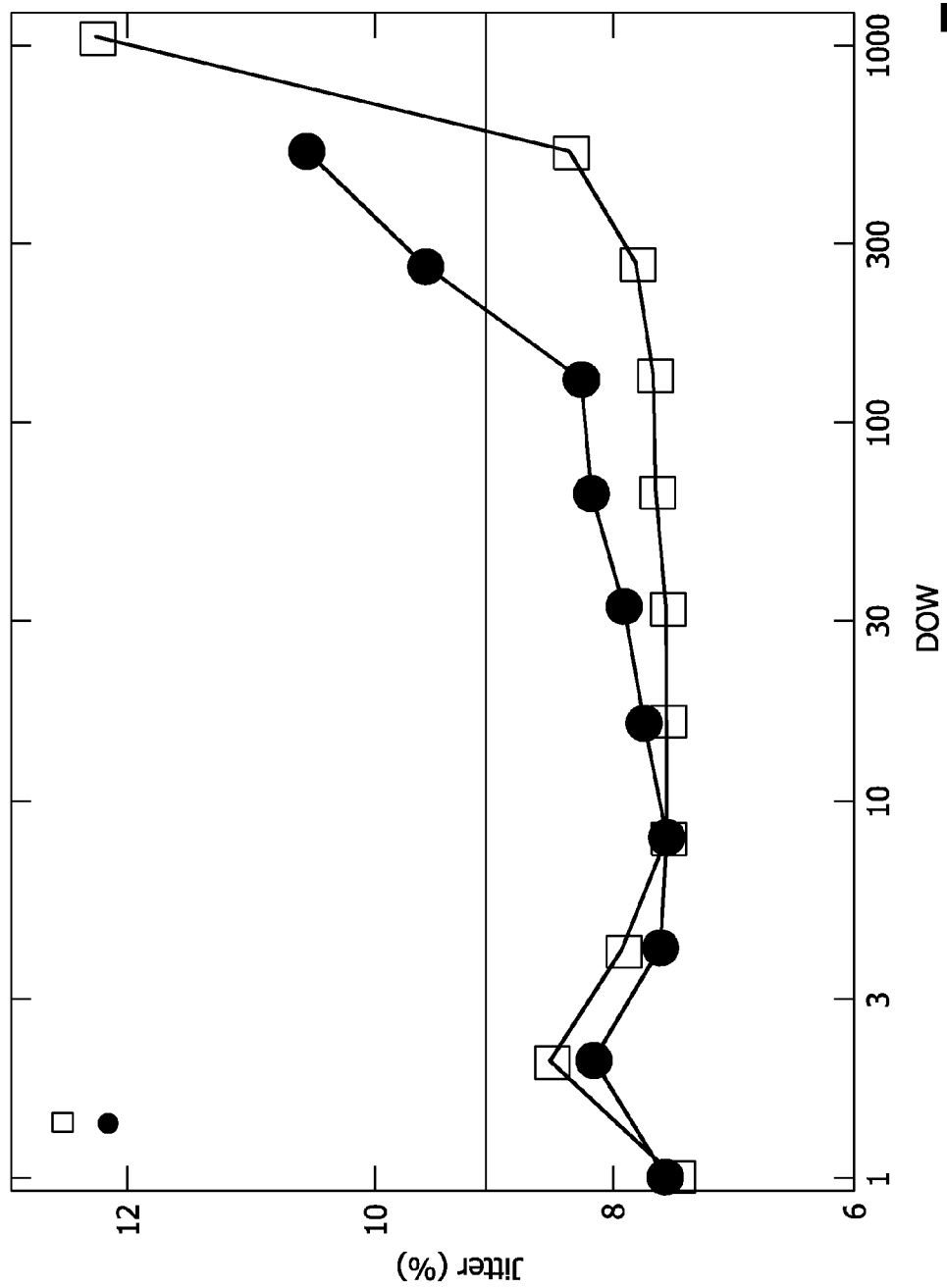

FIG. 6 illustrates the difference in the measured jitter as function of the number of direct overwrites (DOW) when I3 marks are recording according either to the state of art N/2 strategy (full circles) or to a write strategy according to the present invention (open squares).

Figure 7:
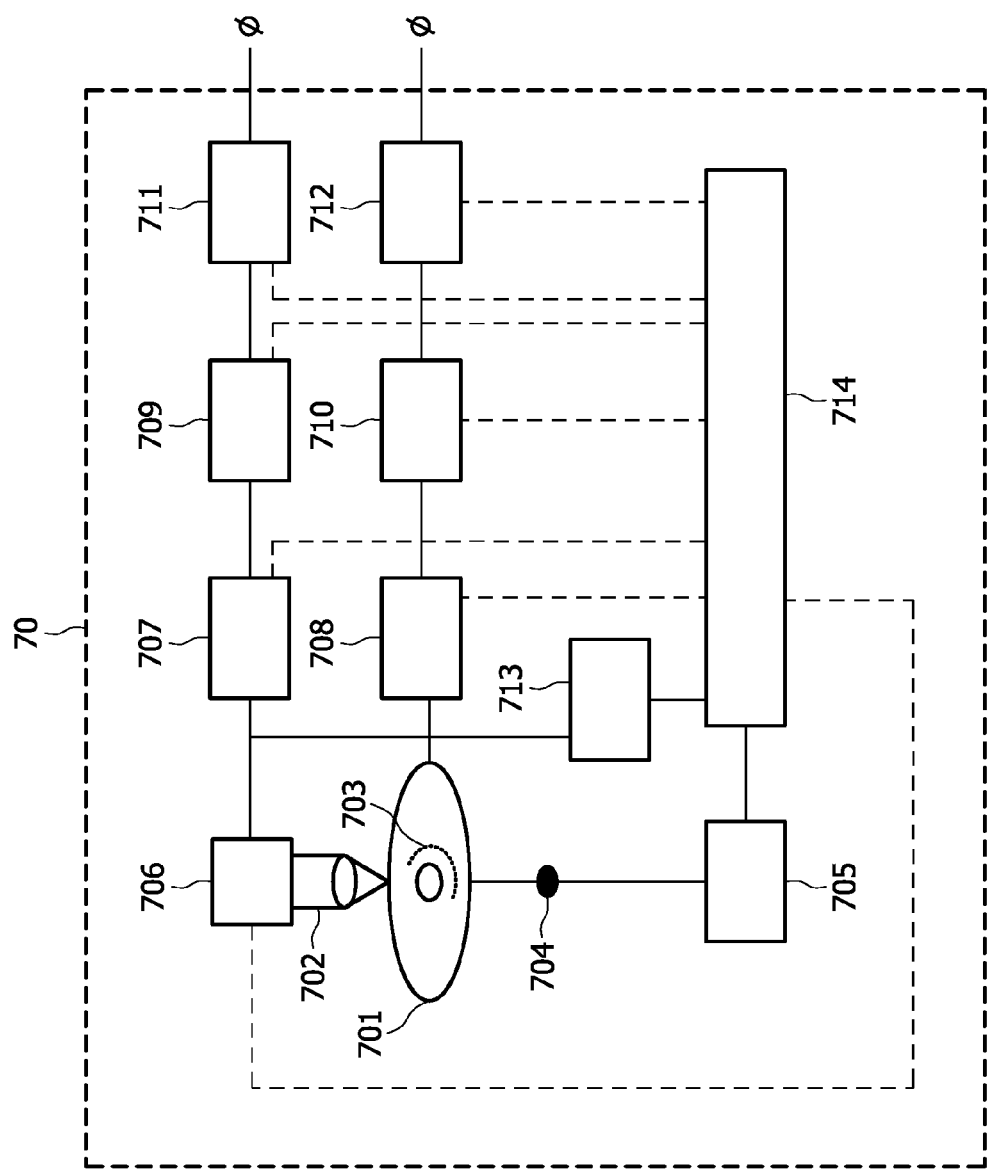

FIG. 7 shows an optical disc drive suited for using of the invention.

Figure 1A:
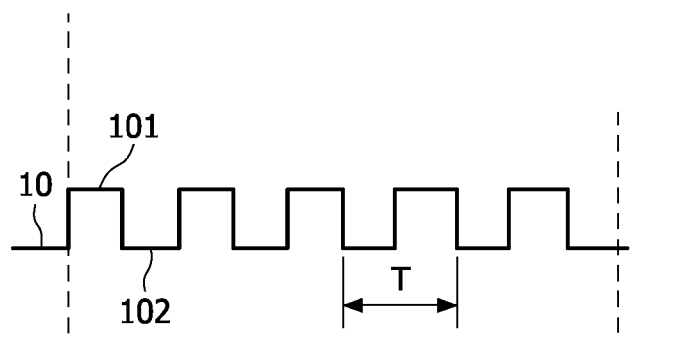
FIG. 1 shows diagrams representing a clock signal, a 5T mark to be recorded, a known method for recording the said mark and a method for recording the said mark according to the invention.
Figure 1B:
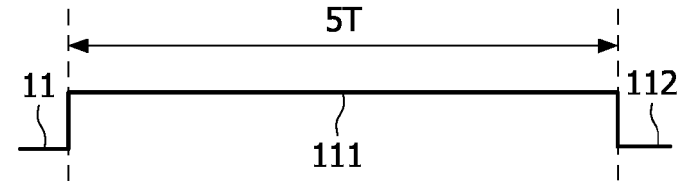

FIG. 1a shows a clock signal 10 of a reference clock having a 'high' part 101 and a 'low' part 102. A combination of one 'high' part and one 'low' part together from one period (T) of this reference clock. FIG. 1b shows a signal 11 to be recorded in the information layer of the record carrier. A 'high' part 111 in this signal 11 is recorded in the information layer as a mark having a physical length corresponding to the time duration of this 'high' part. Consequently, the length of a mark is often expressed in the number of corresponding reference clock periods T. In this example the length of the mark to be recorded, and therefore the 'high' part of the signal 111, is 5T. This mark is also referred in the art as an I5 mark.

Figure 1C:
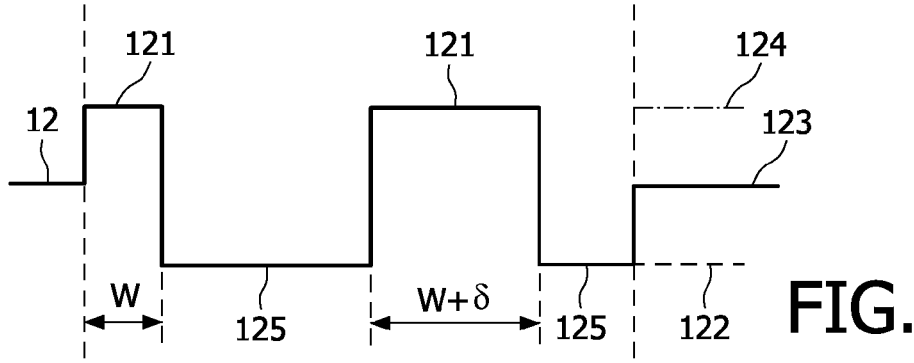

The signal 11 to be recorded is recorded in an information layer having a phase reversibly changeable between a crystalline phase and an amorphous phase by irradiating the information layer with a radiation beam. The radiation beam is generated by a radiation source that is controlled by a control signal 12, 13. The power level of the control signal corresponds to the power of the radiation beam generated by the radiation source. Consequently the control signal corresponds to a sequence of write pulses used in recording a mark. FIG. 1c illustrates a pulsed control signal for recording a mark of length 5T (I5), according to a prior art method known as N/2 or 2T write strategy. When recording an I5 mark, the sequence of write pulses comprises two radiation pulses in the control sequence having a write power level 121. In this specific example, the two write pulses from the sequence have different time lengths, the second write pulse being longer than the first. The write pulses are separated by cooling periods 125. In the cooling periods the radiation beam may have a cooling power level 122, which is lower than the write power level. Before and after the write pulses the control signal has an erase power level 123 sufficient for erasing previously recorded marks. The power of the erase signal is higher than that during the cooling periods and lower than that of the write pulses. Further details of this known 2T method will be discussed later with reference to FIG. 2.

Figure 1D:
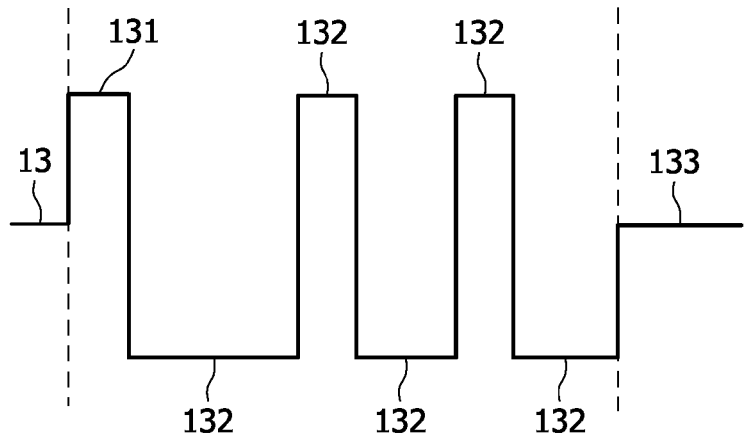

FIG. 1d illustrates a pulsed control signal 14 used for recording the same 5T mark in a method according to the invention. Herein, the sequence of write pulses comprises three write pulses instead of the two write pulses use in the known 2T write strategy. Modification of the known method is a consequence of the fact that the second write pulse from the state of art sequence of radiation pulses as illustrated in FIG. 1c is much longer than the first and therefore replaced by two shorter write pulses. Consequently the highest temperature that is reached in the material stack during recording the 5T mark is lower for the method according to the invention.

FIG. 2 further illustrates the state of art method of recording marks known as N/2 or 2T write strategy. In FIG. 2 the sequences of write pulses used in recording marks of lengths 3T to 14T is illustrated. This range of mark lengths corresponds to the EFM+ encoding strategy, used in recording DVD media. However, other encoding strategies are known in the art, and the corresponding range of mark length may vary. For example, in the case of Blu-ray Disc (BD), marks of lengths 2T to 9T are recorded.

A mark of length n is recorded by a sequence of write pulses comprising Floor(n/2) write pulses, wherein Floor(n/2) describes the largest integer smaller that n/2. For example, mark I3, of length 3T, is recorded by a sequence comprising a single write pulse. Said N/2 write strategy is a preferred write strategy for high-speed rewritable recording, for example in the case of 8× DVD+RW media.

The time length of a write pulse comprised in a sequence, the cooling periods between two write pulses and the total length of a sequence of write pulses may vary. FIG. 2 illustrates a representative example with respect to said time lengths. In general, within said N/2 write strategy, the longest individual write pulse corresponds to the single write pulse used in recording the I3 mark. Moreover, the last write pulse from the sequence used in recording marks of uneven length (I5, I7, I9, I11 and I13) is sometimes longer than the rest of the write pulses within the corresponding sequence but shorter than the single write pulse used in recording the I3 mark.

N/2 or 2T write strategy as exemplified here is a particular embodiment of a more general strategy, known under the name N/α write strategy. According to the N/α write strategy, a mark of length N is written by a sequence of Floor(N/α) write pulses, wherein Floor(N/α) is the largest integer smaller than N/α.

Figure 3:
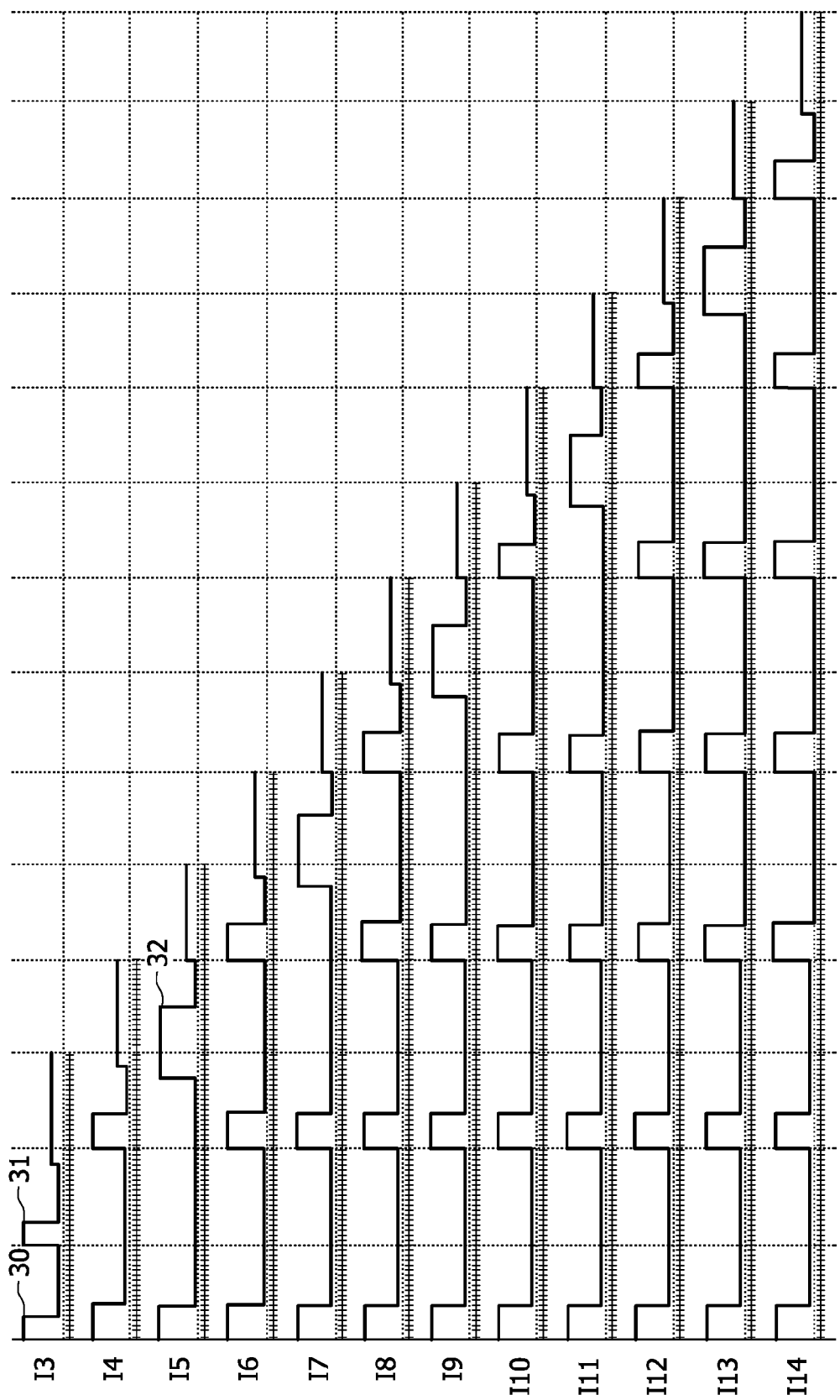
FIG. 3 illustrates a method of recording marks according to a first embodiment of the invention.

A method of recording marks according to a first embodiment of the invention is illustrated in FIG. 3. Comparative to the state of art method as illustrated in FIG. 2, in the method according to the invention the smallest mark (I3), whose corresponding sequence of write pulse comprises the longest individual write pulse from all the sequence, is recorded by means of a sequence comprising two write pulses. The sequences used in recording marks of other lengths remain similar to the state of art method. This modification of the write strategy is based on a new, unexpected insight that the longest individual write pulse is the most harmful to the stack of materials. The method of recording marks according to the invention makes recording these marks less damaging, thus contributing to increasing the number of achievable direct overwrites (DOW) significantly. This new insight will be further discussed later with reference to FIGS. 5 and 6. While the specific embodiment has been illustrated for clarity with respect to the N/2 or 2T strategy, the teachings of the invention are applicable to any write strategy.

Figure 4:
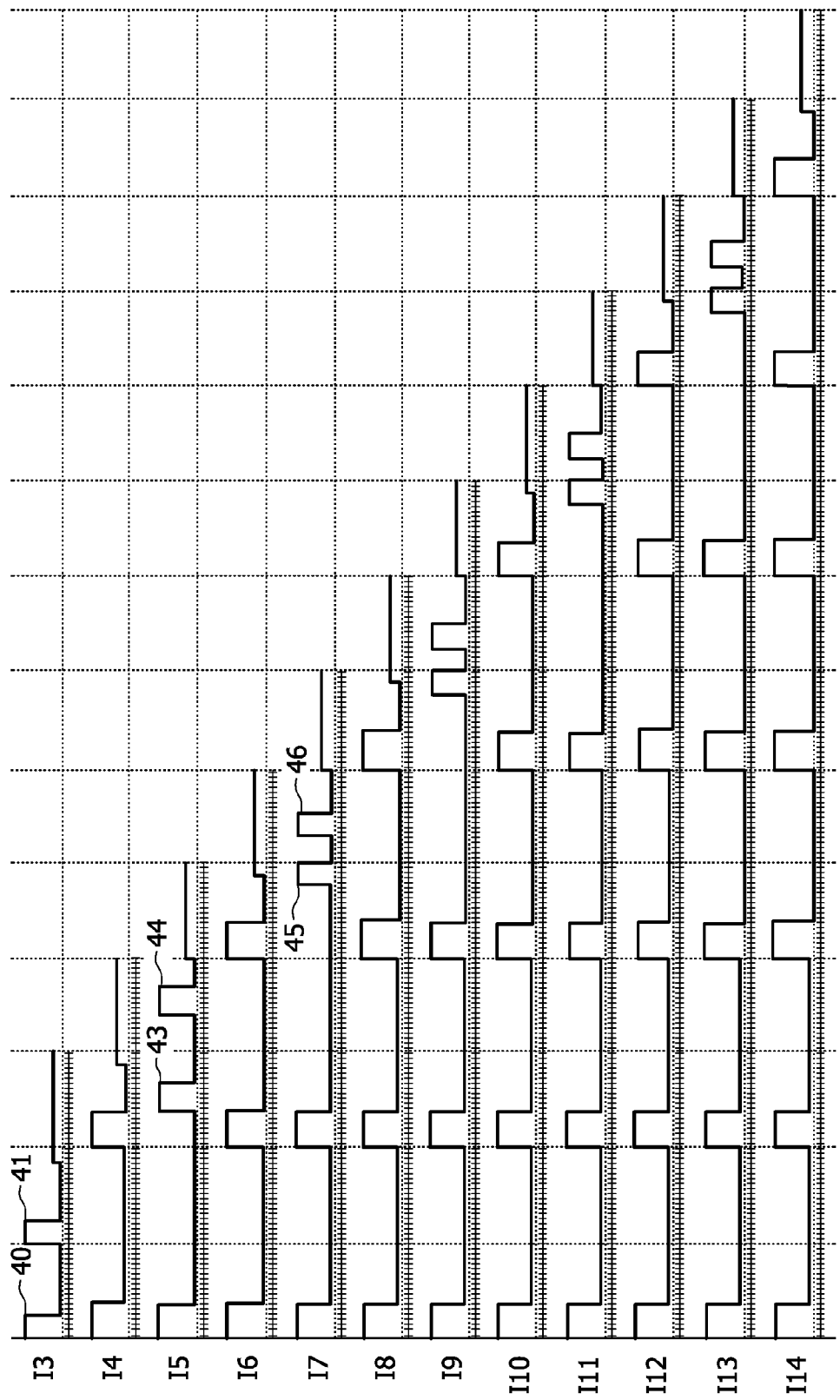
FIG. 4 illustrates a method of recording marks according to a second embodiment of the invention.

A method of recording marks according to a second embodiment of the invention is illustrated in FIG. 4. Comparative to the first embodiment of the invention, not only the mark whose corresponding sequence comprises the longest write pulse from all sequences is modified as described hereinbefore, but each sequence comprising a write pulse that is longer that the median length of the write pulses in the said sequence is replaced by two shorter write pulses. In the specific example illustrated in FIG. 4, the sequences of pulses used in recording marks of uneven length (I5, I7, I9, I11 and I13) are modified accordingly. As illustrated, the last write pulse from the corresponding sequences is replaced with two write pulses.

When recording marks according to the second embodiment of the invention, for example in the specific case when choosing α=2, the number of write pulses comprised in a sequence is given by Ceiling(n/m), wherein Ceiling(n/m) defines the smallest integer that is larger than n/m.

Optionally, as illustrate in FIG. 4, the lengths of individual write pulses and the cooling periods between two write pulses may vary within a sequence or within sequences used for marks of different length. For example, in the case of the sequence used in recording the I5 mark, the first write pulse in the sequence is longer that the subsequent write pulses (43, 44) and the cooling periods are different. The cooling periods may vary in between marks of different length, for example the cooling period between write pulses 43 and 44, comprised in the sequence used in recording to mark I5, is different from the cooling period between write pulses 45 and 46, comprised in the sequence used in recording to mark I7.

The sequence of write pulses may be followed by an erase pulse, the power of the erase pulse being lower than that of a write pulse. In general the position of the last write pulse within a sequence, for example pulse 41 for mark I3 or pulse 44 for mark I5, is set in dependence on the time length of the mark to be written.

Optionally (not illustrated in FIG. 3 or 4), the power of at least one pulse may be set in dependence on the time length of the mark (n).

Preferably, the threshold in deciding whether an individual write pulse is much larger than the median length of the write pulses within a sequence so that it is preferably replaced by two write pulses, is set to 5% of the median time length of the write pulse comprised in the sequence.

Figure 5:
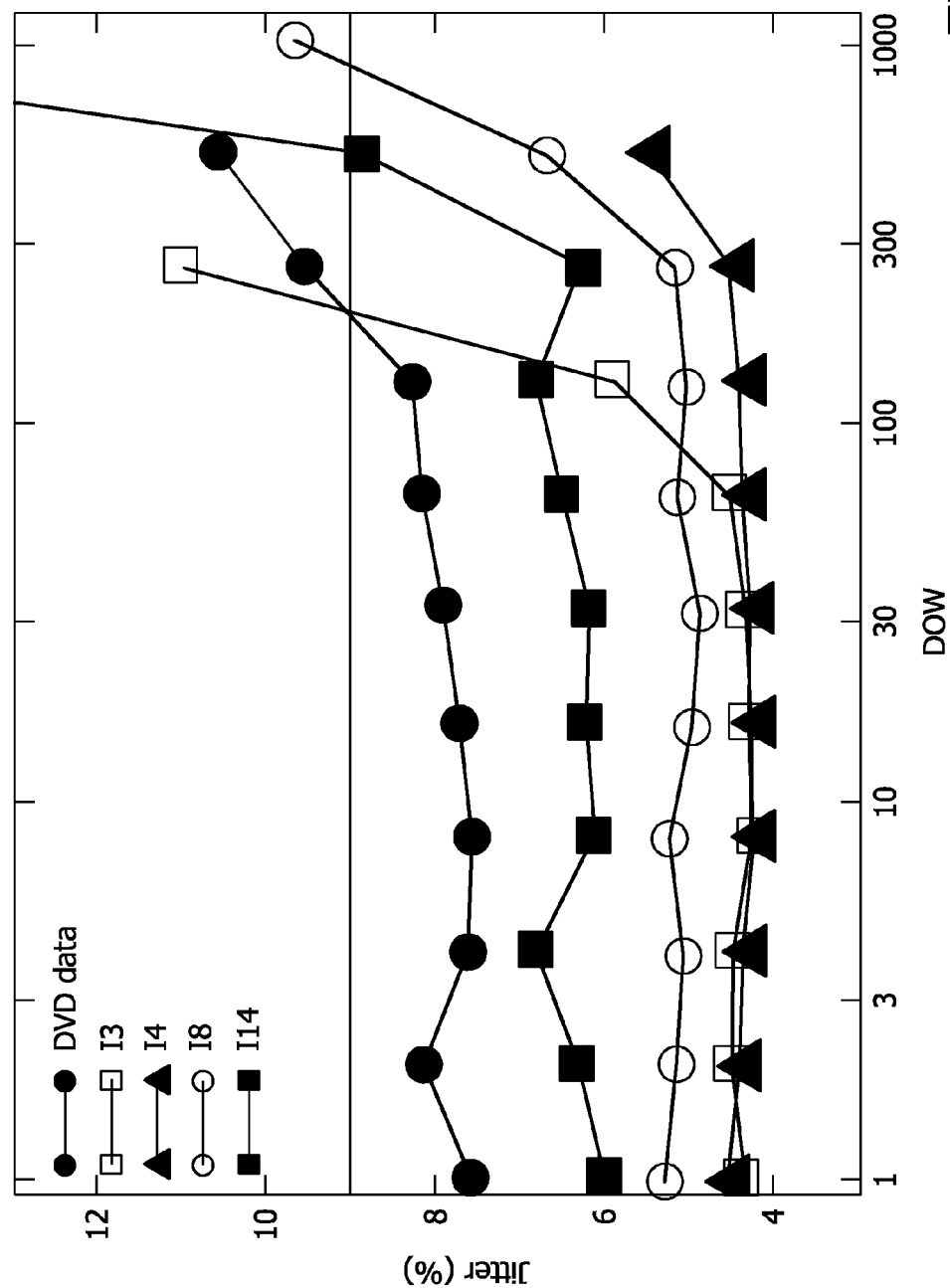
FIG. 5 illustrates the dependence of the measured jitter on the number of direct overwrites (DOW) when marks are recording according to the state of art N/2 or 2T write strategy when.

FIG. 5 illustrates the dependence of the measured jitter of data recorded onto an optical disc as function on the number of direct overwrites (DOW) when marks of a single length are recording according to the state of art N/2 strategy, in the specific case when:

only I3 marks are recorded (open squares);
only I4 marks are recorded (full triangles);
only I8 marks are recorded (open circles);
only I14 marks are recorded (full squares);
representative DVD data is recorded (full circles).

The jitter is due to variation in the length of the marks and is the most important source of noise for information readout, therefore is a measure for the quality of the written data. For example, the DVD standard specifies that the maximum allowed value for the jitter is 9%. When the results for marks I4, I8, and I14 are compared, the stack shows a faster degradation when longer marks are recorded, indicating a negative influence of the higher average temperatures that arise in the longer pulses. This trend confirms the expectation that recording longer marks is more damaging to the information layer. However, against expectations, recording the shortest mark I3 is the most damaging, showing the fastest increase in the jitter as function of the number of direct overwrites (DOW). Compared to the sequence of write pulses used in recording longer marks, the sequence used in recording mark I3 comprises the longest individual write pulse. Consequently, the peak temperature that is reached during the recording of such an I3 mark is higher than the maximum temperature that is reached during the writing process of a longer mark, leading to the strongest degradation of the material stack.

FIG. 6 illustrates the difference in the measured jitter as function of the number of direct overwrites (DOW) when I3 marks are recording according either to the state of art N/2 strategy (full circles) or to a write strategy according to the present invention (open squares).

Clearly, the jitter remains more stable when the a write strategy according to the invention is used: the number of achievable direct overwrites (DOW) greatly improves by a factor of three from 200 to 600, only by modifying the sequence comprising the longest individual write pulse, in our particular example mark I3. Based on this insight, it is desirable to choose the new duration of the write pulse comprised in the sequence used in recording mark I3 equal or shorter than the duration of the write pulses (the so-called multi-pulses) comprised in the other sequences, in order to limit the peak temperature during recording of I3 marks. The degradation of the information layer due to use of a long write pulse recording of I3 marks cannot be solved by simply reducing the time length of the write pulse for recording of I3 marks in the original strategy, as this would lead to a total reduction in the amount of energy dissipated in the information layer and, consequently, the mark will either have a shorter length or the power may not be sufficient to record the mark.

Next an embodiment of a recording apparatus wherein the invention may be practiced will be described with reference to FIG. 7. The recording apparatus 70 comprise a recording medium receiving means 704 for receiving a removable recording media 701. The recording media 701 may be an optical disc of rewritable type, such as DVD+RW or BD-RE. The recording media 701 is rotationally driven by rotation means 704. An optical pick-up unit 706, movable in a radial direction of the recording media, is used for recording marks along a spiral track 703 on the recording media, by employing a radiation beam 702. To this purpose the recording media 701 is provided with an information layer comprising a suitable phase change material which has different optical properties in the crystalline or amorphous states. The radiation beam 702 is modulated by the recording means 707 according to the digital information signals to be recorded. This digital information signal have been suitably encoded with encoding means 709, employing know modulation schemes like EFM or EFM+ and CIRC error encoding. Input means 711, which may comprise A/D conversion means and/or specific interface circuitry, may receive analog and/or digital information. In addition, address finding means 713 are provided to determine the address information present on the recording media 701. Digital information signals on the recorded media may be read by the same pick-up unit 706 by suitable reading means 708. These connect to decoding means 710 to performs decoding and CIRC error correction according to known schemes. The decoded and corrected signals are outputted, via outputting means 712, which may comprise D/A means and/or suitable interface circuitry, digital and/or analog information signals.

All units of the recording apparatus are controlled by the controlling unit 714. The controlling unit 714 may comprise a processing unit which operates according to a specific program loaded in memory means, in order to perform the method according to the invention. In particular the controlling unit 714 is responsible for generating the control signal that is used by the recording means 707 and the optical pick-up unit 706 in generating the modulated radiation beam 702.

Optical disc of rewritable type comprise am information zone, where user data is recorded in a continuous spiral track. The track shows periodic variations from a perfect spiral known under the name wobbles, which a reading/recording apparatus uses to generate a clock signal. Several pieces of information may be pre-recorded on the optical disc during the manufacturing process. For example, in the case of DVD+RW optical discs, said information may be stored by means of phase modulating the wobble of the tracks (Address-in-Pregroove—ADIP). Said information may comprise information referring to the allowed write strategies and physical parameters to be used in recording the optical disc. In a preferred embodiment of the invention, an optical disc comprises, preferably pre-recorded during manufacturing, information enabling a recording apparatus to record marks onto the optical disc according to a method of the invention as described hereinbefore. Such information may comprise any of the following and/or combinations thereof:

the number of pulses to be used in recording a mark of length n, for example, in a preferred embodiment given by the formula Ceiling(n/α), where α is an integer number larger than 2;

the maximum width of an write pulse from a sequence of pulses used in recording a mark of a given length.

It should be noted that the above-mentioned embodiments are meant to illustrate rather than limit the invention. And that those skilled in the art will be able to design many alternative embodiments without departing from the scope of the appended claims. It is especially noted that the invention is not limited to the use with multi-layered records only. As described earlier, the invention is also particularly advantageous when applied in high speed recording systems.

In the claims, any reference signs placed between parentheses shall not be construed as limiting the claim. Use of the verbs "comprise" and "include" and their conjugations do not exclude the presence of elements or steps other than those stated in a claim. The article "a" or an" preceding an element does not exclude the presence of a plurality of such elements. The invention may be implemented by means of hardware comprising several distinct elements and by means of software. In a system/device/apparatus claim enumerating several means, several of these means may be embodied by one and the same item of hardware or software. The mere fact that certain measures are recited in mutually different dependent claims does not indicate that a combination of these measured cannot be used to advantage.

The invention claimed is:

1. A method of recording marks onto an optical disc, the optical disc comprising an information layer, by irradiating the information layer by a pulsed radiation beam,
   a mark (I3 . . . I14) having a time length of nT, n representing an integer larger than one and T representing the length of one period of a reference clock, being recorded by a sequence comprising m write pulses separated by cooling periods, the write pulses within the sequence being allowed to have different time lengths,
   the method determining:
   the number m of write pulses in a mark having the shortest time length corresponds to Ceiling (n/a), wherein Ceiling (n/a) defines the smallest integer that is larger than n/a
   the number m of write pulses in the marks of other time lengths corresponds to Floor(n/a), where Floor(n/a) defines the largest integer smaller than n/a, wherein a is an integer number larger than or equal to 2, wherein an individual write pulse exceeding a known threshold is recorded as a sequence comprising two write pulses, said threshold being determined with respect to a median write pulse length in the sequence.

2. A method of recording marks according to claim 1, wherein setting a=2 and mark I3, having a length 3T, being recorded by a sequence comprising two write pulses.

3. A method of recording marks according to claim 1, wherein setting a=3 and marks I3 and I4, having lengths of 3T and 4T, respectively, being recorded by sequences each comprising each two write pulses.

4. A method of recording marks according to claim 1, wherein the sequence of write pulses being followed by an erase pulse, the power of the erase pulse being lower than the power of a write pulse.

5. A method of recording marks according to claim 1, wherein the power of at least one pulse being set in dependence on n.

6. A method of recording marks according to claim 1, wherein the position of at least one pulse being set in dependence on n.

7. A recording apparatus arranged to record marks onto an optical disc, the optical disc comprising an information layer, by irradiating the information layer by a pulsed radiation beam, a given mark (I3 ... I14) having a time length of nT, n representing an integer larger than one and T representing the length of one period of a reference clock, being recorded by a sequence comprising m write pulses separated by cooling periods, the write pulses within the sequence being allowed to have different time lengths, said recording apparatus determining:

the number m of write pulses in a mark having the shortest time length corresponds to Ceiling (n/a), wherein Ceiling (n/a) defines the smallest integer that is larger than n/a; and the number m of write pulses in the marks of other time lengths corresponds to Floor(n/a), where Floor(n/a) defines the largest integer smaller than n/a, wherein a is an integer number larger than or equal to 2, wherein an individual write pulse exceeding a known threshold is recorded as a sequence comprising two write pulses, said threshold being determined with respect to a median write pulse length in the sequence.

8. An optical disc comprising stored information, the information being preferably pre-recorded onto the optical disc during the manufacturing process, the information arranged such that when read by a recording apparatus it enables the recording apparatus to record marks onto the optical disc said marks being recorded by a sequence comprising m write pulses separated by cooling periods, the write pulses within the sequence being allowed to have different time lengths, the information comprising:

the number m of write pulses in a mark having the shortest time length corresponds to Ceiling (n/a), wherein Ceiling (n/a) defines the smallest integer that is larger than n/a; and the number m of write pulses in the marks of other time lengths corresponds to Floor(n/a), where Floor(n/a) defines the largest integer smaller than n/a, wherein a is an integer number larger than or equal to 2, wherein an individual write pulse exceeding a known threshold is recorded as a sequence comprising two write pulses, said threshold being determined with respect to a median write pulse length in the sequence.

9. An optical disc according to claim 8, characterized in that the pre-recorded information comprises information with respect to the number of write pulse comprised in a sequence for recording a mark of a given length.

10. An optical disc according to claim 8, characterized in that the pre-recorded information comprises information with respect to the length of each write pulse comprised in a sequence for recording a mark of a given length.

11. An optical disc according to claim 8, characterized in that the optical disc is a rewritable DVD disc.

* * * * *